United States Patent [19]

Byers et al.

[11] Patent Number: 5,168,555
[45] Date of Patent: Dec. 1, 1992

[54] INITIAL PROGRAM LOAD CONTROL

[75] Inventors: Larry L. Byers, Apple Valley; Joseba M. Desubijana, Minneapolis, both of Minn.

[73] Assignee: Unisys Corporation, Blue Bell, Pa.

[21] Appl. No.: 403,637

[22] Filed: Sep. 6, 1989

[51] Int. Cl.[5] .................... G06F 13/14; G06F 13/362
[52] U.S. Cl. .................... 395/325; 395/425; 395/725; 364/DIG. 2; 364/966.4; 364/967.4; 364/970
[58] Field of Search ... 364/200 MS File, 900 MS File, 364/DIG. 1, DIG. 2; 395/200, 275, 700, 425, 325

[56] References Cited

U.S. PATENT DOCUMENTS

| | | | |
|---|---|---|---|
| 3,641,505 | 2/1972 | Artz et al. | 364/200 |
| 3,906,452 | 9/1975 | Möder | 364/900 |
| 4,491,914 | 1/1985 | Susaku | 395/700 |
| 4,507,730 | 3/1985 | Johnson et al. | 364/200 |
| 4,562,532 | 12/1985 | Nishizawa et al. | 364/200 |
| 4,688,172 | 8/1987 | Wright | 364/200 |
| 4,750,136 | 6/1988 | Arpin et al. | 364/200 |
| 4,752,870 | 6/1988 | Matsumura | 395/200 |
| 4,775,931 | 10/1988 | Dickie et al. | 364/200 |
| 4,783,731 | 11/1988 | Miyazaki et al. | 364/200 |
| 4,814,982 | 3/1989 | Weir | 364/200 |
| 4,884,195 | 11/1989 | Endo | 364/200 |
| 4,969,085 | 11/1990 | Desjourdy | 364/200 |
| 4,979,106 | 12/1990 | Schneider | 395/700 |
| 4,979,107 | 12/1990 | Advani et al. | 395/700 |
| 5,038,320 | 8/1991 | Heath et al. | 395/275 |

*Primary Examiner*—David L. Clark
*Assistant Examiner*—John C. Loomis
*Attorney, Agent, or Firm*—John B. Sowell; Glenn W. Bowen; Mark T. Starr

[57] ABSTRACT

A multi-processing system of the type having a plurality of MSUs is provided with a support controller in each MSU. Each of the MSUs is provided with a plurality of the interface registers, one for each associated MSU to be connected to the master MSU. Each support controller in each MSU is provided with an initial program load (IPL) controller and each IPL controller is provided with a scan settable control coupled to an external keyboard or console which permits unique scan settable information to be loaded into the IPL controller for setting the interface registers and for interconnecting the MSUs in a desired multi-processing configuration.

9 Claims, 3 Drawing Sheets

INITIAL PROGRAM LOAD CONTROL

BACKGROUND OF THE INVENTION

1. Field of the Invention

The present invention relates to multi-processing systems and the control apparatus employed to initially program a multi-processor configuration and the associated MSUs for operation. More specifically, the present invention is directed to the initial program load control which enables one of a plurality of memory storage units to automatically configure itself as a master and to configure the remaining memory storage units in a processor system as slave memory storage units.

2. Description of the Prior Art

Large mainframe computer systems may be configured as multi-processor computing systems. Heretofore, such multi-processor systems have been reconfigurable so as to isolate or define more than one multi-processor system from the components of a large multi-processor mainframe system. Heretofore, the time required to make hardware and software reconfigurations in a multi-processor system in order to change an application may be as much as an hour. Further, when the multi-processor system is originally manufactured, the extensive use of hardware to reconfigure a multi-processor system has required an inordinate amount of time for manufacture and debugging to assure that the components in a multi-processing system can be properly reconfigured and still be cooperative with each other without producing errors. A typical prior art mutli-processing system for large mainframe computers includes as many as four memory storage units which may be connected in different configurations to as many as four instruction processors and four input/output processors. Accordingly, it would be desirable to provide a system and means for rapidly configuring and rapidly reconfiguring four MSUs into different configurations for the optimum and most efficient data processing systems.

SUMMARY OF THE INVENTION

The primary object of the present invention is to provide a novel initial program load control system for automatically reconfiguring the components and processes of a multi-processing system for an optimum configuration.

It is another general object of the present invention to provide means for rapidly changing the configuration of multi-processor systems.

It is another general object of the present invention to provide an initial program load control for changing the master-slave relationship of a plurality of MSUs of any configurable application from a keyboard or a master console.

It is another general object of the present invention to provide an initial program load control having a system status register for implementing the reconfiguration of a multi-processor system.

It is another general object of the present invention to provide an initial program load control with a novel partitioning register for automatically indicating which MSU of a plurality of MSUs is the master and which are the slave MSUs in a particular configuration.

It is another general object of the present invention to provide an initial program load control which has associated therewith interfaces comprising settable switches of the MSU to operably interconnect the desired MSU configuration of a multi-processor computer system.

It is a general of the present invention to provide a novel circuit and system for setting up a multi-processor system configuration which is more reliable than those heretofore known in the prior art.

According to these and other objects of the present invention, there is provided a multi-processing system of the type having a plurality of support controls, each associated with an MSU. Each MSU has a plurality of interfaces adapted to be configured and connected through ports of the MSU into data processing systems. A system support processor is provided in the master console of the multi-processing system to enable the initial program load control located in each of the MSUs to configure the MSUs and their associated circuitry into a desired configuration processing system without any hardware modification.

DESCRIPTION OF THE PREFERRED EMBODIMENT

Figure 1:
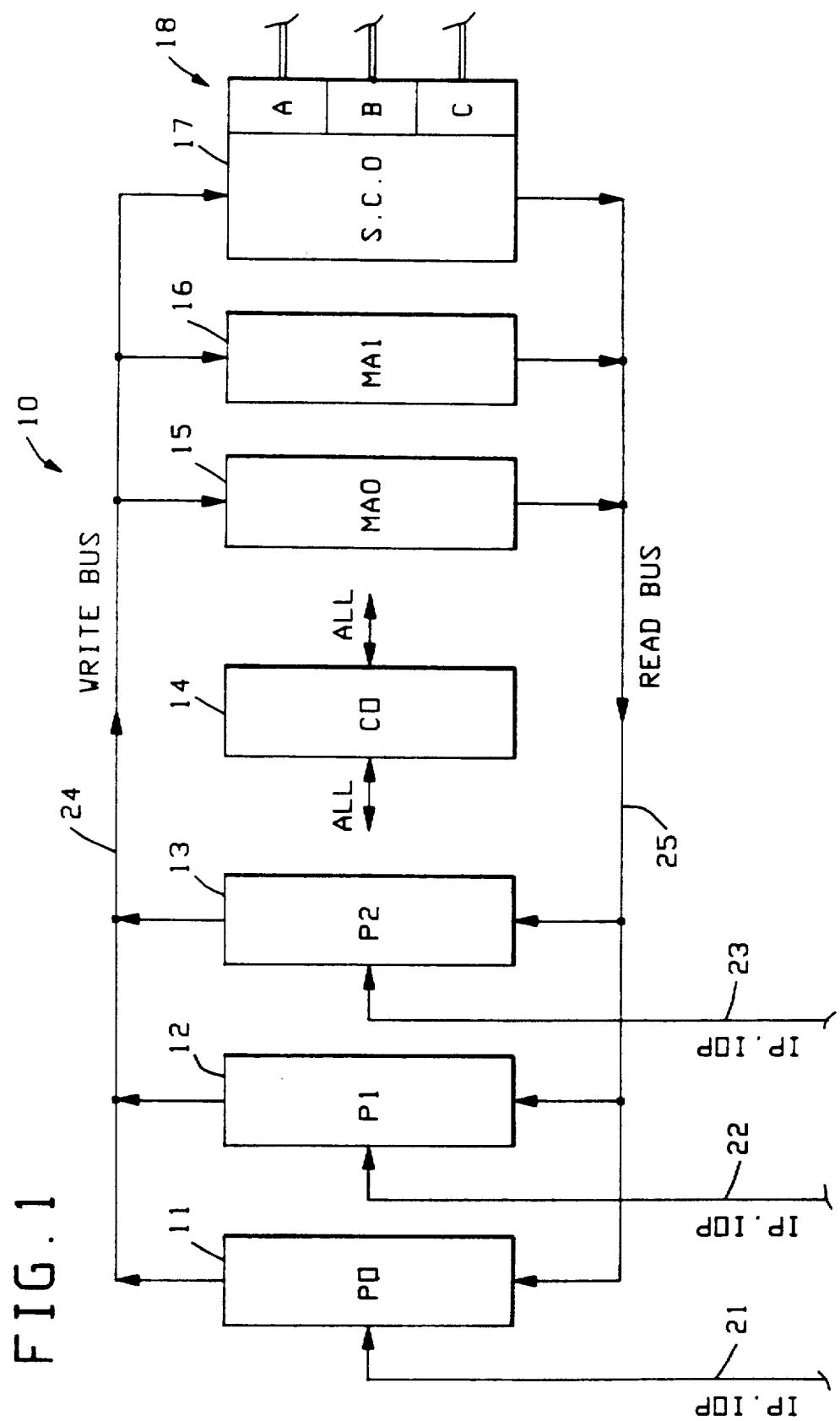
FIG. 1 is a schematic block diagram of a single preferred embodiment memory storage unit (MSU) shown being connectable to instruction processors and input-output processors to provide a multi-processor system.

Refer now to FIG. 1 showing one of the plurality of MSUs employed in a multi-processor computer system. MSU 10 comprises port cards 11, 12 and 13 shown as P0, P1 and P2. A control card C0 numbered 14 supplies the control functions for all of the cards in the MSU system being described. Memory array cards 15 and 16 shown as MA0 and MA1 provide the mass memory for the instruction processors and input-output processors which are provided with their own cache memory. A system control card 17 is shown having three MSU interfaces 18, A, B and c, for reference purposes in the description which follows. Busses 21, 22 and 23 are shown connected to the port cards 11, 12 and 13 on which the instruction processes and input-output processors are connected into the MSU system 10. In the preferred embodiment of the present invention, up to four input-output processors and four instruction processors may be configured in numerous desirable computing systems. However, the bus which connects to a particular port card is a fixed connection and does not have to be changed for designing a reconfigurable multi-processor system, as will be explained in more detail hereinafter. The instruction processors and I/O processors connect to the memory storage units via the port cards 11, 12 and 13 and the read bus 24 and the write bus 25 as is commonly known for some computing systems. It will be understood that the unnumbered control lines shown at the control card 14 are connected to all of the elements in the system to maintain a central control of the MSU.

Figure 2:
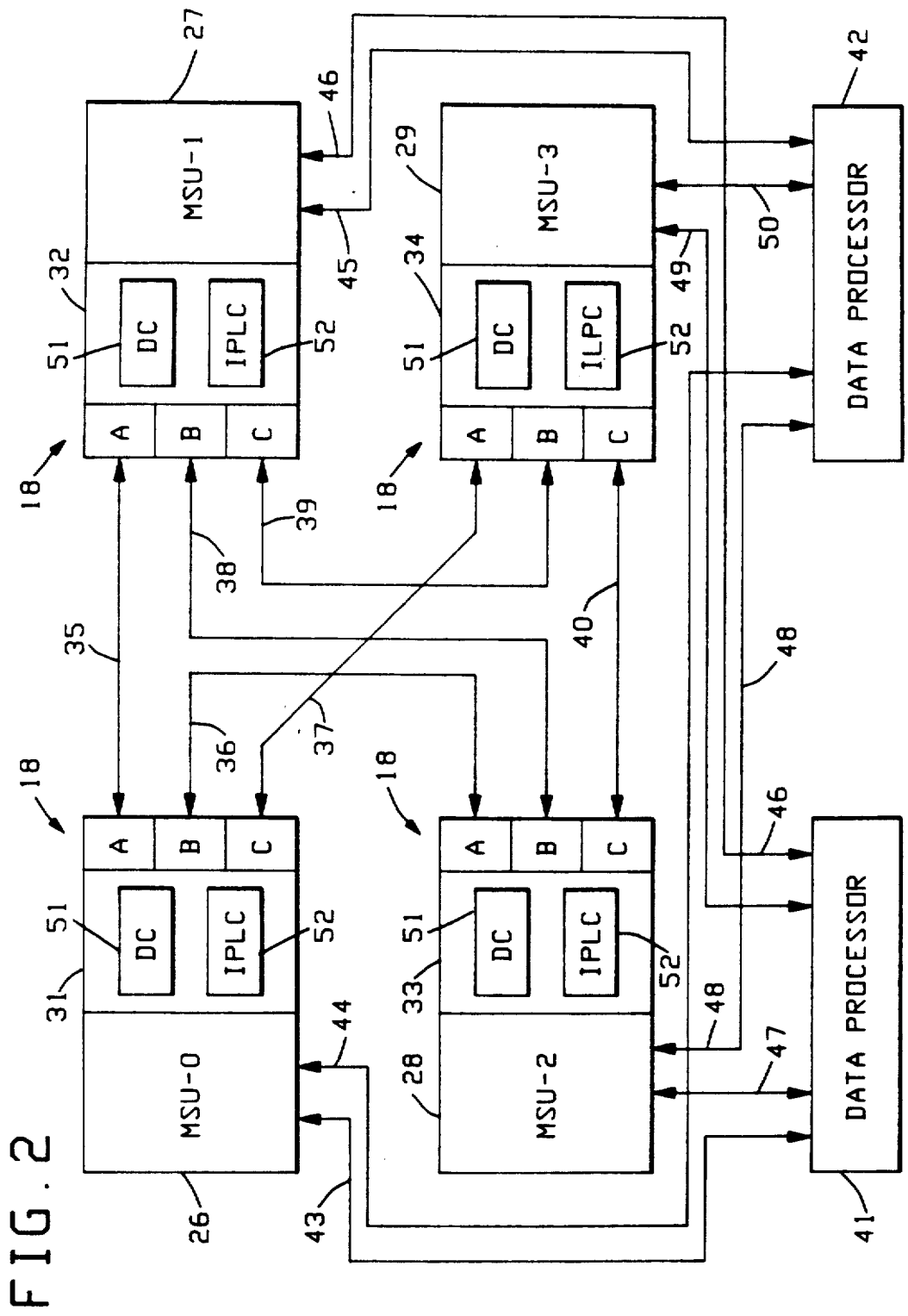
FIG. 2 is a schematic block diagram showing four present invention MSUs, each having three input-output interfaces interconnected by means of six double cables.

Refer now to FIG. 2 showing a schematic block diagram of four MSUs of the type shown in FIG. 1. The four MSUs are numbered 26–29 representing MSUs 0–3. Connected to the MSUs are the aforementioned support controls, here renumbered 31-34. Each of the support controls 31-34 are shown having three interfaces A, B and C which were previously identified as interfaces 18. Each of the interfaces A, B and C of the MSUs is shown connected by single lines 35 to 40 (each comprising an input-output pair of cables).

Two data processors 41 and 42 are shown connected to the four MSUs by means of busses 43-50. It will be understood from the previous description of FIG. 1 that the connection from a data processor to an MSU must be via one of the port cards 11, 12 or 13 and the associated read-write busses 25, 24 of an MSU system.

Each of the support controls 31-34 located on a support control card, like card 17, has located thereon a day clock 51 and a initial program load control system 52 to be described in greater detail and functional operation hereinafter.

Figure 3:
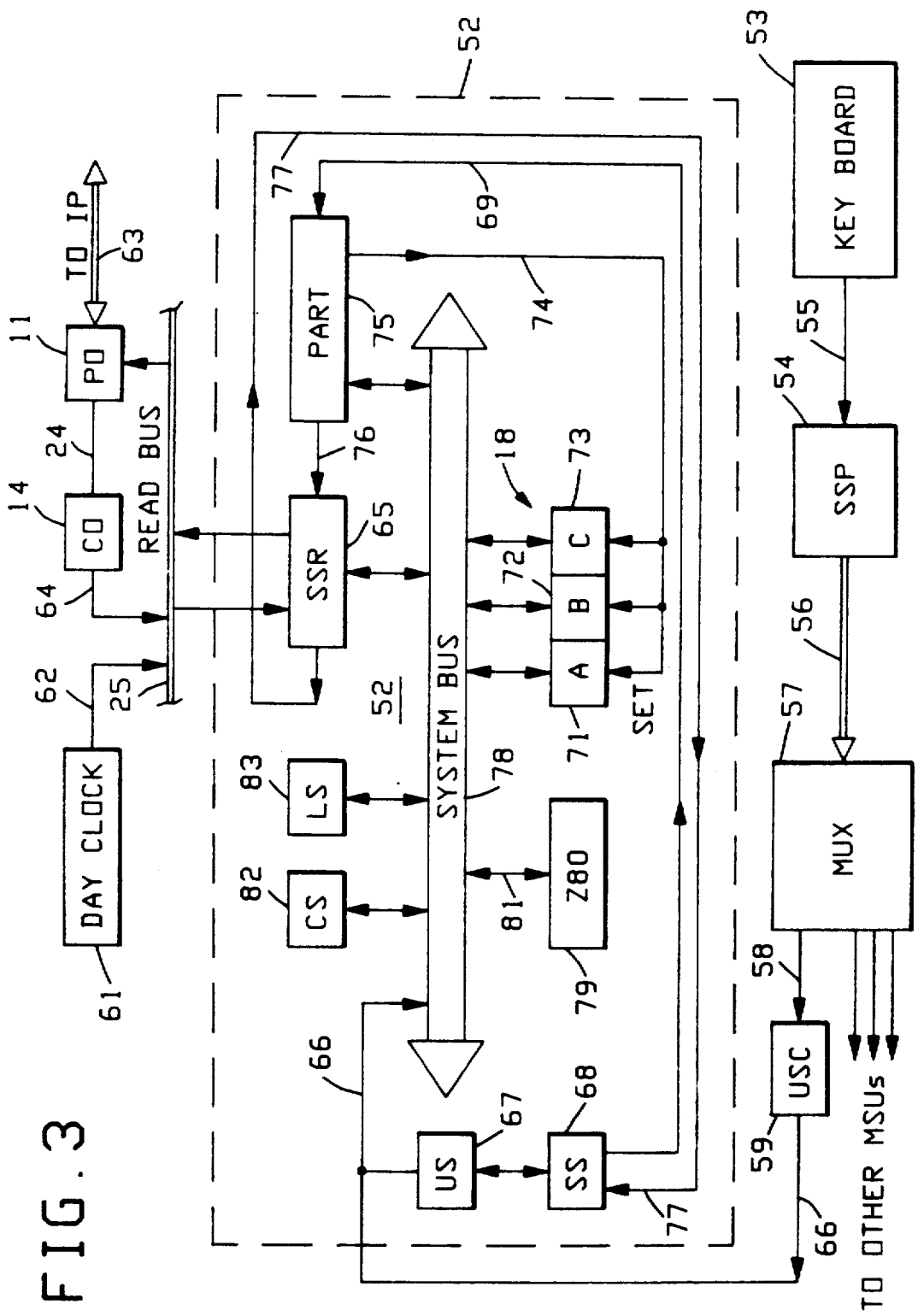
FIG. 3 is a schematic block diagram of one of the initial program load (1 PL) controls showing related control structure common to the IPL controls.

Refer now to FIG. 3 showing a block diagram of one of the present invention initial program load controls of the type shown in FIG. 2. The IPL control or controller 52 is shown inside of phantom lines connected to the structure of a multi-processor system which is external to the support control and may be external to the MSU.

Each multi-processor system is provided with a master console comprising at least a keyboard 53 connected to a system support processor 54 by means of bus 55 and is connected by a bus 56 to multiplexer means 57 having an output for each of the support controls 31-34. The components 53, 54 and 57 in the master console are employed to manually select a variety of configurations and programs residing in the system support processor 54 and to output this information on bus 58 connected to a unit support control 59 located in each of the MSUs. Control 59 is provided with hardware and logic unique to its associated MSU for supplying the information necessary to form a communications channel between the console and the MSU. A day clock 61, which is in the system control 17 is shown connected by line 62 through a read bus 25 of the type provided at each of the MSUs to the IPL controller 52. Further, a bus 63 is shown connected to a port PO card 11 which connects via the write bus 24 to the aforementioned control card 14 which connects to all of the elements and cards in an MSU system of the type shown in FIG. 1. One of the control lines 64 from the control card 14 is shown connected to a system status register 65 which resides inside of the phantom lines 52 representing the initial program load controller 52.

For purposes of discussion hereinafter, assume that the data processors 41 and 42 in FIG. 2 are connected to one of the port cards 11-13 shown in FIG. 1, and it is desirable to reconfigure the system shown in FIG. 2. For example, assume that data processor 41 needs to be only connected to MSU0 and MSU2 as already shown via busses 43 and 47 and busses 44 and 48 may be automatically disconnected at the port cards as will be explained hereinafter. Similarly, a second data processing system may be established by connecting busses 45 and 50 to MSU1 and MSU3 and disconnecting the busses 49 and 46 from data processor 41 and MSUs 1 and 3. Further, since MSU0 no longer needs to cooperate with MSU1, the interface switches at interfaces 18 and the cable 35 are disconnected and the interface switches at the cables 37, 38 and 40 are also programmably disconnected so as to reconfigure the computer shown in FIG. 2 in a very short period of time, as will now be explained.

The program necessary to establish the aforementioned configuration resides in the system support processor 54 which is accessible and activated by keyboard 53 and through multiplexer 57 and its associated unit support controller 59 to permit the system to be dynamically "booted up". The first sequence of operations configures the interfaces A, B and C of the MSUs as hereinbefore described. The second sequence of operations sets the scan set latches to configure the system being set up from the master console comprising the keyboard 53 and system support processor 54. The program information on bus 66 enters the controller 52 at unit support logic 68 and is applied to the scan set logic 68 to provide output signals on line 69 for setting the individual interface latches 71, 72 and 73 of the MSU to MSU interfaces A, B and C. The signals circulate via lines 69 to the input of partitioning register 75 and via line 76 to the input of system status register 65. The return path of the series scan set configuration signals is shown as line return path 77. Once the latches representing the partitioning register 75 bit positions and the system status register 65 bit positions are dynamically established, then the scan set logic 68 informs the system support processor 54. Then the information in partitioning register 75 is transferred via bus 74 to the input logic of latches 71, 72 and 73 to set the interface latches. Now the system support processor 54 can raise the IPL initial program load signal to the system bus 78 of the control processor comprising a Z80 microprocessor 79 linked to the system bus by a bus 81. In the preferred embodiment of the present inveniton, the interfaces A, B and C each comprise twenty-two switch positions. The partitioning register 75 comprises seventeen latch or switch positions, and the system status register 65 comprises seventy-two latches or switches. Processor 79 has an associated E PROM control store 82 which contains the instruction set for the Z80 microprocessor 79. Local store 83 comprising RAM storage contains the scratchpad and the boot block code for initializing the system.

Once the interface, registers, petition register and system status registers are properly loaded, the command from the system support processor 54 causes the micro-processor 79 to initiate the load program sequence. The program is loaded upon receipt of a non-maskable interrupt which takes priority over all other interrupts. Each micro-processor 79 in the controllers 52 on the support control cards 17 in each of the MSU reads three special bits in its system status register 65. Only one of the MSUs has the three special bits loaded in its system status register which defines the one MSU that will boot up the application system. The other MSUs are subservant to the unique master MSU and form slave MSUs in the system.

The manner in which this operation is performed is that the master MSU, which receive the non-maskable interrupt signal, broadcasts on one of its interface lines to all other MSUs a transfer load path signal. The transfer load path signal causes all of the MSUs, including the processor 79 initiating the transfer load path signal, to first clear the acknowledge transfer load path signal in all of the interfaces in all of the MSUs in the multiprocessor system configuration. Subsequently, the master MSU and its associated initial program load controller 52 (having a processor 79) raises the acknowledge transfer load path signal informing all of the other initial load path controllers in all of the MSUs of the configurable system that they are subservant slaves and he is the master and he will perform the boot up operation. Subsequently, the micro-processor 79 in the master MSU employs the boot up information in the local store 83 to perform the boot up operation and when completed informs the instruction processor via a control line (not shown) that the instruction processor may proceed with the applications program for the newly configured multi-processor system. For the program initiated by the instruction processor, the day clock 61 and the system status register 65 (comprising seventy-two bits) form a master clock and control for the newly configured system.

Having explained a preferred embodiment system employing four MUSs and two data processors, it will be understood that a data processor may comprise more than one instruction processor (IP) and more than one input-output processor (IOP), thus enabling the user of the over-all mainframe computing system to automatically define and configure several smaller computer systems from time to time for special application programs. This permits faster throughput and optimum utilization of the computing system. Then the system may be reconfigured for other applications in a minimum of time.

Having explained how the initial program load control is capable of configuring a multi-processor computer system, it will be appreciated that the three aforementioned bits which define the master-slave relationship may be changed since one of the MSUs is a master and the other MSUs are slaves, one of the slaves may be dynamically loaded with the information to cause it to be the master and by a minor changeover, the new initial program load control system 52 can take over, employing its system status register and day clock.

What is claimed is:

1. In a multi-processing system, apparatus for configuring a plurality of memory storage units (MSUs) into configurable processing systems of the type for utilization by one or more instruction processors (IPs) of the multi-processing system, said apparatus being configurable from master console means, the apparatus comprising:
 a plurality of MSUs each having a plurality of interface registers connected by input-output cables to the interface registers of all of the other MSUs in the multi-processor system,
 support control means in each MSU,
 each said support control means in each MSU having its own initial program load (IPL) controller coupled to receive initial program load information from said master console means,
 said IPL controller comprising scan settable control means for receiving and storing input configuration information,
 said scan settable control means comprising a partitioning register (75), microprocessor means (79-83) and a system status register (65) coupled to said master console means for receiving said initial program load information, said initial program load information comprising partitioning register load information and system status register load information,
 said partitioning register load information being for configuring its MSU interface registers to selective couple its interface registers to the interface registers of other MSUs,
 said system status register load information being for configuring said microprocessor means to be booted and enabled as a master or a slave microprocessor means for one of said configurable processing systems comprising at least one IP and a plurality of MSUs wherein one of said MSUs is enabled as a master MSU, and
 said master console means having means for initiating the loading of said initial program load information to prepare the master microprocessor means in said IPL controller in said configurable processing systems for program operation.

2. A multi-processing system as set forth in claim 1 wherein said master console means comprises a keyboard for manually initiating operations in said multi-processor system.

3. A multi-processing system as set forth in claim 2 wherein said master console means further comprises a system support processor containing a plurality of configuration programs and for supplying said input information to said IPL controller.

4. A multi-processing system as set forth in claim 1 wherein each said microprocessor means in each IPL controller in each MSU comprises an associated E PROM memory loaded with an executable program for controlling said microprocessor means with identical control information.

5. A multi-processor system as set forth in claim 4 wherein each said microprocessor has an associated static RAM memory containing scratchpad information and boot up information which is identical for each microprocessor.

6. A multi-processor system as set forth in claim 1 wherein said system status register of the IPL controller of said master microprocessor comprises the only system status register used for controlling the operation of one of said configurable processing systems.

7. A multi-processor system as set forth in claim 6 which further includes a day clock coupled to said master microprocessor's MSU via a read bus coupled to the master MSU for supplying start up synchronized timing for the configurable processing system.

8. A multi-processing system as set forth in claim 1 wherein said system status register of each MSU's microprocessor means when programmed contains a unique set of master control commands which identifies the master microprocessor's MSU and the other MSUs as slave MSUs in the configurable processing system.

9. A multi-processing system as set forth in claim 8 wherein said unique set of commands which identifies the master microprocessor's MSU may be altered by said IPL controllers to change the status of the master MSU to a slave MSU and one of the other MSUs to a master MSU.

* * * * *